United States Patent
Okada

(10) Patent No.: US 8,989,023 B2
(45) Date of Patent: Mar. 24, 2015

(54) MONITORING APPARATUS, MONITORING METHOD, AND COMPUTER-READABLE STORAGE MEDIUM

(75) Inventor: Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 797 days.

(21) Appl. No.: 13/298,345

(22) Filed: Nov. 17, 2011

(65) Prior Publication Data

US 2012/0182880 A1   Jul. 19, 2012

(30) Foreign Application Priority Data

Jan. 19, 2011   (JP) .................................. 2011-009276

(51) Int. Cl.

| | | |
|---|---|---|
| G01R 31/08 | (2006.01) | |
| G06F 11/00 | (2006.01) | |
| H04J 3/08 | (2006.01) | |
| H04J 1/10 | (2006.01) | |
| H04W 24/00 | (2009.01) | |
| H04L 1/18 | (2006.01) | |
| H04L 1/00 | (2006.01) | |
| H04W 24/10 | (2009.01) | |
| H04W 28/04 | (2009.01) | |
| H04W 84/04 | (2009.01) | |

(52) U.S. Cl.
CPC .............. *H04W 24/00* (2013.01); *H04L 1/1887* (2013.01); *H04L 2001/0097* (2013.01); *H04W 24/10* (2013.01); *H04W 28/04* (2013.01); *H04W 84/047* (2013.01)

USPC ............ 370/246; 370/315; 370/492; 370/501

(58) Field of Classification Search
None
See application file for complete search history.

(56) References Cited

U.S. PATENT DOCUMENTS

| 7,266,758 B2 | 9/2007 | Takeuchi et al. |
| 7,386,036 B2 * | 6/2008 | Pasanen et al. ............... 375/211 |
| 2008/0045147 A1 * | 2/2008 | Okuda ............................ 455/15 |
| 2011/0151773 A1 * | 6/2011 | Okuda ............................. 455/9 |

FOREIGN PATENT DOCUMENTS

| JP | 2005-167347 A | 6/2005 |
| JP | 2006-165789 A | 6/2006 |

OTHER PUBLICATIONS

Japanese Office Action mailed Jun. 24, 2014 for corresponding Japanese Application No. 2011-009276, with Partial English Translation, 4 pages.

* cited by examiner

*Primary Examiner* — Ashley Shivers
(74) *Attorney, Agent, or Firm* — Fujitsu Patent Center

(57) ABSTRACT

A monitoring apparatus may receive data transmitted from a transmitting source apparatus at predetermined time intervals, via relay apparatuses configured to make a retransmission request depending on a reception error, and measure a reception time interval between consecutively received data. The monitoring apparatus may judge which one of the relay apparatuses is making the retransmission request, based on the measured reception time interval.

9 Claims, 17 Drawing Sheets

FIG.7

| RELAY INTERVAL | RETRANSMISSION TIME INTERVAL (ms) |
|---|---|
| INTERVAL A | 23 |
| INTERVAL B | 26 |
| INTERVAL C | 29 |

FIG.9

| RELAY INTERVAL | RETRANSMISSION TIME INTERVAL (ms) |
| --- | --- |
| INTERVAL A | 25 |
| INTERVAL B | 29 |
| INTERVAL C | 34 |

FIG.11

| RELAY INTERVAL | RETRANSMISSION TIME INTERVAL (ms) |
|---|---|
| INTERVAL A | 25 |
| INTERVAL B | 22 |
| INTERVAL C | 30 |

FIG.14

| RELAY INTERVAL | RETRANSMISSION TIME INTERVAL (ms) |
|---|---|
| INTERVAL A | 25 |
| INTERVAL B | 22, 24, 26 |
| INTERVAL C | 30 |

FIG.16

| RELAY INTERVAL | RETRANSMISSION TIME INTERVAL (ms) |
| --- | --- |
| INTERVAL A | 25 |
| INTERVAL B | 22~30 |
| INTERVAL C | 30 |

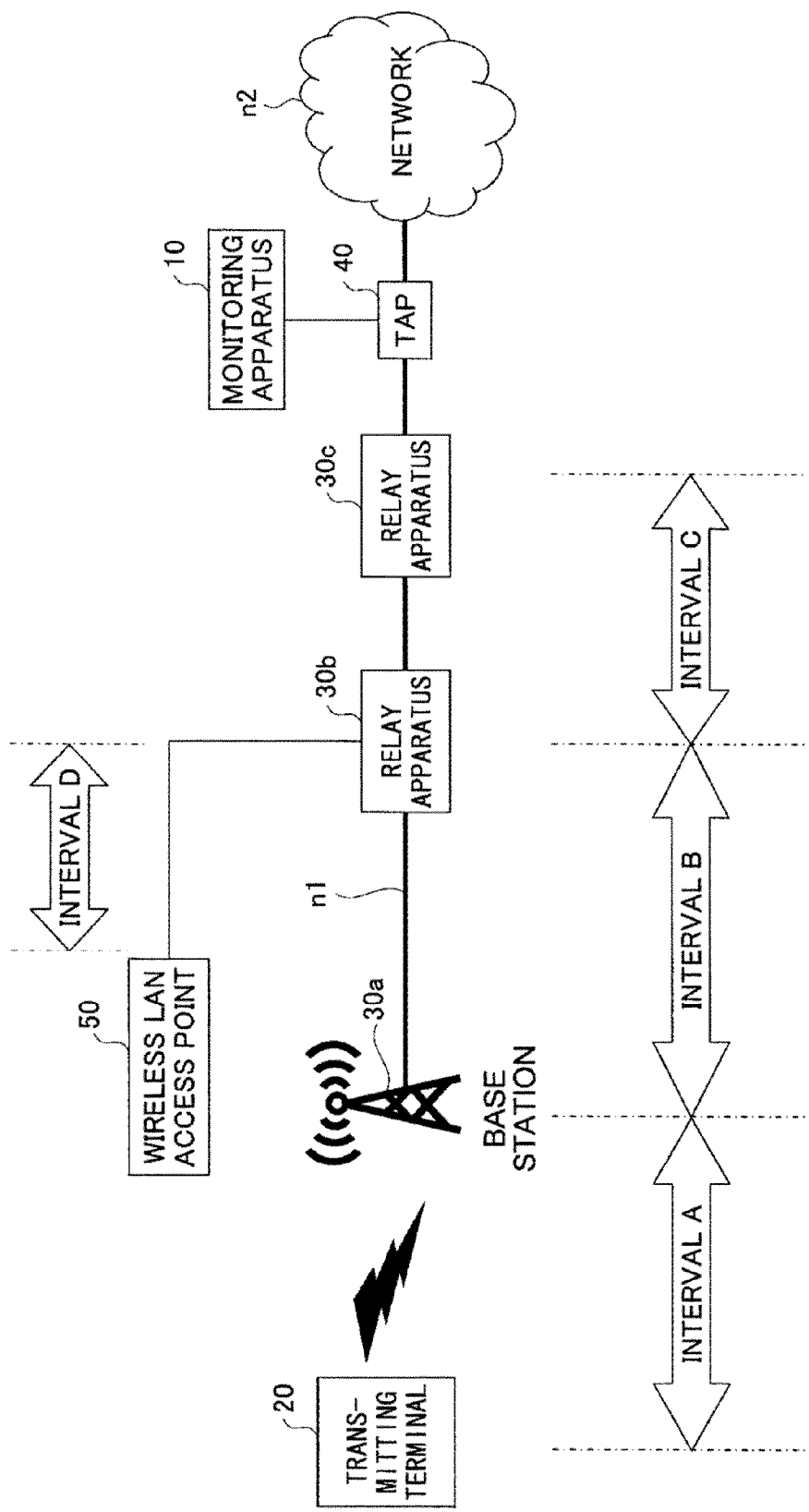

MONITORING APPARATUS, MONITORING METHOD, AND COMPUTER-READABLE STORAGE MEDIUM

CROSS-REFERENCE TO RELATED APPLICATIONS

This application is based upon and claims the benefit of priority of the prior Japanese Patent Application No. 2011-009276, filed on Jan. 19, 2011, the entire contents of which are incorporated herein by reference.

FIELD

The present invention relates to a monitoring apparatus, a monitoring method, and a computer-readable storage medium that stores a program for monitoring a network.

BACKGROUND

Recently, due to developments in information technology, bidirectional communications may be performed actively via a packet communication network. IP (Internet Protocol) telephones use the VoIP (Voice over Internet Protocol) that enables audio communication via the Internet, by making transmission and reception via the packet communication network. It may be regarded that the amount of communications performed by the IP telephones via the packet communication network will increase in the future. Hence, for IP telephone service providers, the importance of monitoring and managing the speech quality is likely to increase.

On the other hand, in the field of portable telephones, an operation may be performed in accordance with the communication quality or, a service may be provided in accordance with the communication quality, by measuring the loss rate, delay, and the like of the packets flowing through the packet communication network.

However, in the related art, it may be difficult to specify the location where a failure is generated.

SUMMARY

Accordingly, it is an object in one aspect of the embodiment to provide a monitoring apparatus, a monitoring method, and a computer-readable storage medium, that may estimate a location where a retransmission request is generated as a location where a failure is generated or, estimate an interval in which the failure is generated.

According to one aspect of the present invention, a monitoring apparatus may include a processor; and a storage unit configured to store a program to be executed by the processor, wherein the processor includes a receiving part configured to receive data transmitted from a transmitting source apparatus at predetermined time intervals, via a plurality of relay apparatuses configured to make a retransmission request depending on a reception error; a measuring part configured to measure a reception time interval between consecutively received data; and a judging part configured to judge one of the plurality of relay apparatuses making the retransmission request, based on the reception time interval measured by the measuring part.

According to one aspect of the present invention, a monitoring method to be implemented in a computer may include receiving data transmitted from a transmitting source apparatus at predetermined time intervals, via a plurality of relay apparatuses configured to make a retransmission request depending on a reception error; measuring a reception time interval between consecutively received data; and judging, by the computer, one of the plurality of relay apparatuses making the retransmission request, based on the reception time interval measured by the measuring.

According to one aspect of the present invention, a non-transitory computer-readable storage medium that stores a program which, when executed by a computer, causes the computer to perform a monitoring process, may include a receiving procedure to receive data transmitted from a transmitting source apparatus at predetermined time intervals, via a plurality of relay apparatuses configured to make a retransmission request depending on a reception error; a measuring procedure to measure a reception time interval between consecutively received data; and a judging procedure causing the computer to judge one of the plurality of relay apparatuses making the retransmission request, based on the reception time interval measured by the measuring procedure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 is a diagram illustrating an example of a structure of a retransmission time interval storage unit in the first example embodiment;

FIG. 9 is a diagram illustrating an example of stored contents of the retransmission time interval storage unit when the retransmission process time is taken into consideration;

FIG. 11 is a diagram illustrating an example of the structure of the retransmission time interval storage unit in the second example embodiment;

FIG. 14 is a diagram illustrating an example of the structure of the retransmission time interval storage unit in the third example embodiment;

FIG. 16 is a diagram illustrating an example of the structure of the retransmission time interval storage unit in the fourth example embodiment; and FIG. 17 is a diagram illustrating an example of the network structure having a branch.

DESCRIPTION OF EMBODIMENTS

Preferred embodiments of the present invention will be described with reference to the accompanying drawings.

A description will now be given of the monitoring apparatus, the monitoring method, and the computer-readable storage medium in each embodiment according to the present invention.

Figure 1:
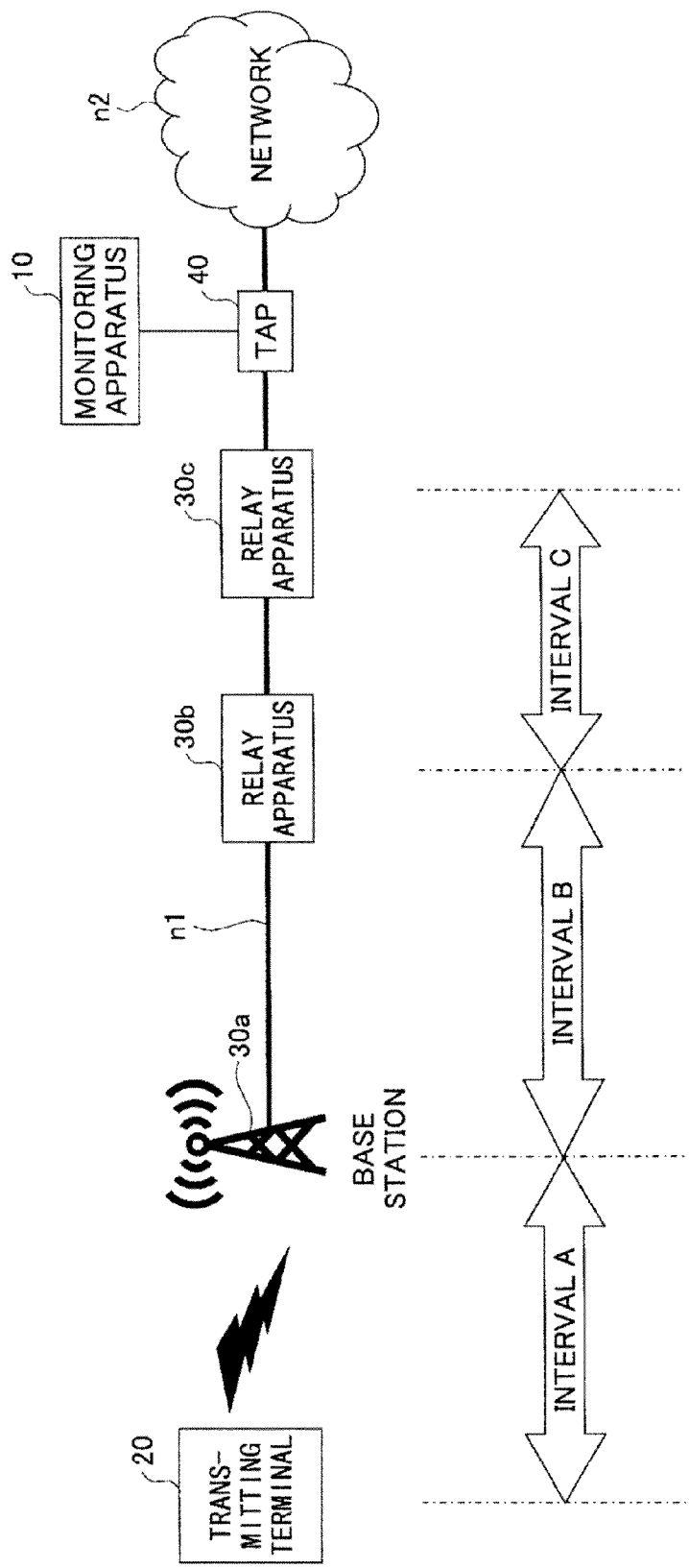
FIG. 1 is a diagram illustrating an example of a network structure in an embodiment.

FIG. 1 is a diagram illustrating an example of a network structure in an embodiment. In FIG. 1, a transmitting terminal 20 and a base station 30a are connected via a wireless network. The base station 30a, a relay apparatus 30b, and a relay apparatus 30c are connected via a cable network. In this embodiment, a network that may include the wireless network and the cable network will be referred to as a "network n1".

For example, a portable communication terminal, such as a portable telephone and a smartphone, may be used as the transmitting terminal 20. In this embodiment, the transmitting terminal 20 becomes a data transmitting source. However, the apparatus that becomes the data transmitting source is not limited to the portable communication terminal and a terminal that communicates by wireless communication. For example, a PC (Personal Computer), an IP (Internet Protocol) telephone, and the like may be used as the data transmitting source. It is assumed for the sake of convenience that a transmitting destination of the data transmitted from the transmitting terminal 20 is a communication equipment belonging to a network n2. In other words, the communication equipment that becomes the transmitting destination of the data transmitted from the transmitting terminal 20 is connected to the network n2. For example, the network n2 may be a LAN (Local Area Network) or a network such as the Internet.

The base station 30a makes direct ratio communication with the transmitting terminal 20. The base station 30a transfers the data received from the transmitting terminal 20 to the relay apparatus 30b.

For example, each of the relay apparatuses 30b and 30c may be a base station control apparatus, a gateway apparatus, a router, and the like. In other words, the relay apparatus 30b transfers the data transferred from the transmitting end (base station 30a) to the relay apparatus 30c. The relay apparatus 30c transfers the data transferred from the transmitting end (relay apparatus 30b) to the network n2.

In this specification, the base station 30a, the relay apparatus 30b, and the relay apparatus 30c may be referred to as a "relay apparatus 30" when not being distinguished from one another.

A tap (or network tap) 40 branches signals flowing through the network n1.

A monitoring apparatus 10 monitors the data flowing through the network n1 based on the signals branched by the tap 40. The monitoring apparatus 10 may judge or specify a relay interval in which a data loss occurs, by monitoring the data. The relay interval refers to an interval of the network n1 that is segmented by the relay apparatus 30. In this embodiment, the relay interval between the transmitting terminal 20 and the base station 30a is referred to as an "interval A". The relay interval between the base station 30a and the relay apparatus 30b is referred to as an "interval B". Further, the relay interval between the relay apparatus 30b and the relay apparatus 30c is referred to as an "interval C".

Figure 2:
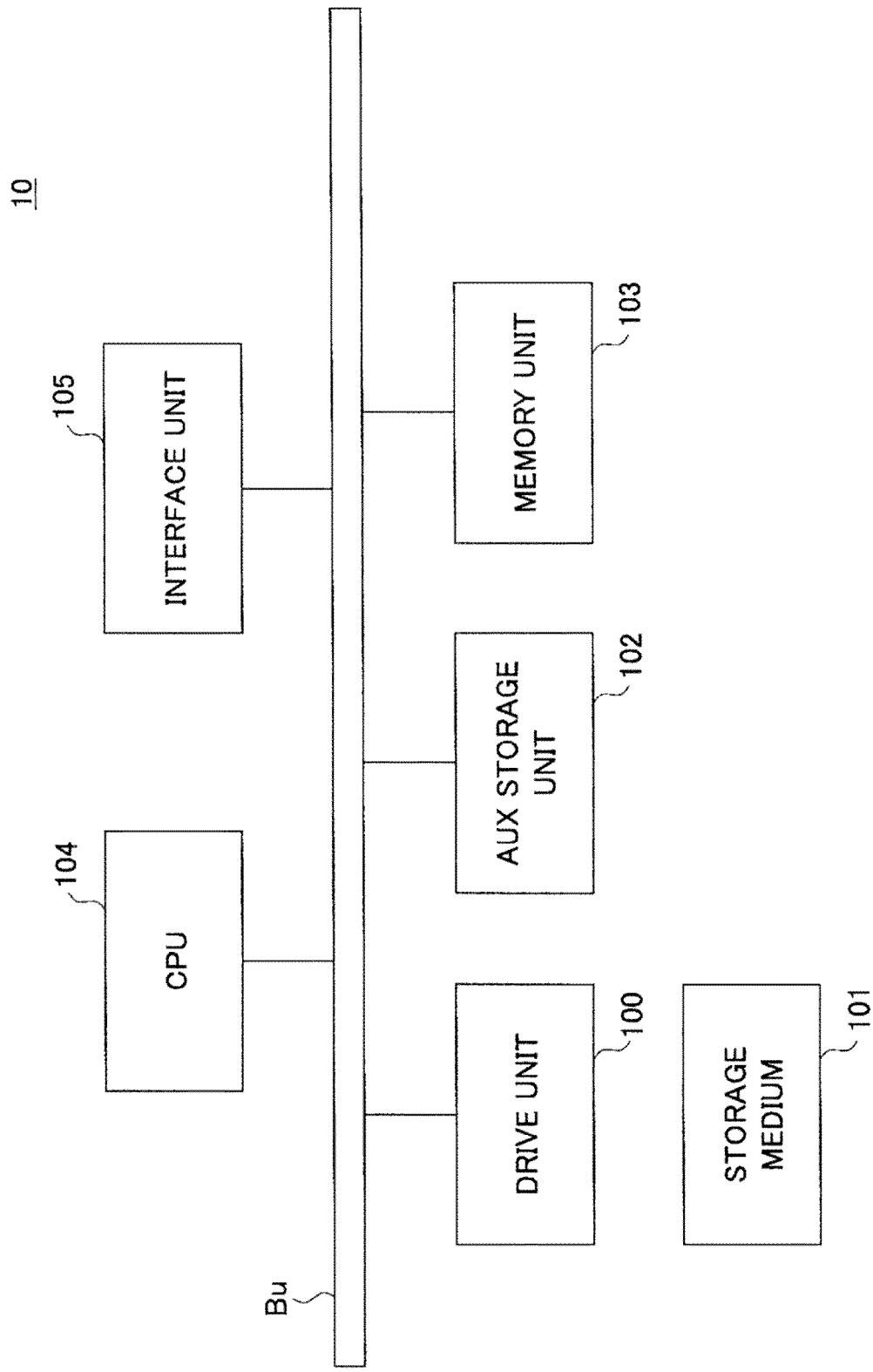
FIG. 2 is a block diagram illustrating an example of a hardware structure of a monitoring apparatus in the embodiment.

FIG. 2 is a block diagram illustrating an example of a hardware structure of the monitoring apparatus in the embodiment. The monitoring apparatus 10 illustrated in FIG. 2 includes a drive unit 100, an auxiliary storage unit 102, a memory unit 103, a CPU (Central Processing Unit) 104, and an interface unit 105 that are mutually connected via a bus Bu.

A program for realizing processes of the monitoring apparatus 10 may be stored in a non-transitory computer-readable storage medium 101. When the storage medium 101 that stores the program is set in the drive unit 100, the program is read from the storage medium 101 and is installed in the auxiliary storage unit 102 via the drive unit 100. Of course, the installing of the program is not limited to using the storage medium 101. For example, the program may be downloaded from another computer via a network. The auxiliary storage unit 102 stores, in addition to the program installed therein, files, data, and the like that may be required.

The memory unit 103 reads the program from the auxiliary storage unit 102 and stores the program therein when a program boot instruction is received. The CPU 104 executes the program stored in the memory unit 103, in order to realize the processes (or functions) of the monitoring apparatus 10. The interface unit 105 provides an interface to connect to the network that is branched by the tap 40.

A display unit (not illustrated), such as a LCD (Liquid Crystal Display), may be connected to the monitoring apparatus 10 in order to display monitored results and the like on the display unit. An input device (not illustrated), such as a mouse and a keyboard, may be connected to the monitoring apparatus 10 in order to input monitoring instructions and the like to be accepted by the monitoring apparatus 10. The monitoring apparatus 10 may be controlled and operated by a computer (not illustrated) via a network. In this case, the display unit, the input device, and the like may be connected to the computer that controls and operates the monitoring apparatus via the network.

Examples of the storage medium 101 may include portable recording media such as a CD-ROM (Compact Disk-Read Only Memory), a DVD (Digital Versatile Disk), and a USB (Universal Serial Bus) memory. In addition, examples of the auxiliary storage unit 102 may include a HDD (Hard Disk Drive), a flash memory, and the like. Each of the storage medium 101 and the auxiliary storage unit 102 may form a non-transitory computer-readable storage medium.

Figure 3:
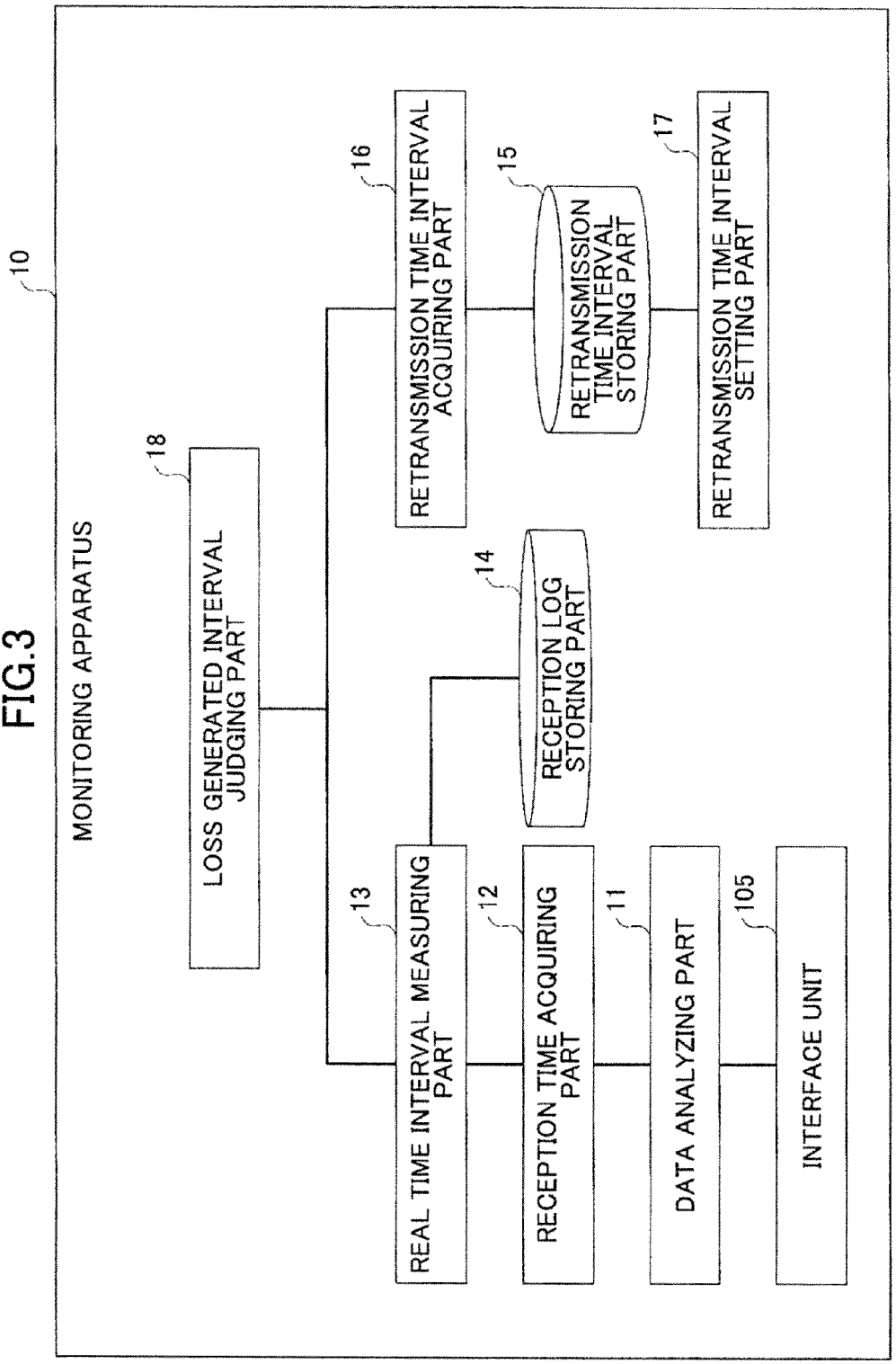
FIG. 3 is a block diagram illustrating a functional structure of the monitoring apparatus in the embodiment.

FIG. 3 is a block diagram illustrating a functional structure of the monitoring apparatus in the embodiment. In FIG. 3, the monitoring apparatus 10 includes a data analyzing part 11, a reception time acquiring part 12, a real time interval measuring part 13, a reception log storing part 14, a retransmission time interval storing part 15, a retransmission time interval acquiring part 16, a retransmission time interval setting part 17, and a loss generated interval judging part 18. The data analyzing part 11, the reception time acquiring part 12, the real time interval measuring part 13, the retransmission time interval acquiring part 16, the retransmission time interval setting part 17, and the loss generated interval judging part 18 may be realized when the monitoring apparatus 10 executes the program installed in the monitoring apparatus 10. The reception log storing part 14 and the retransmission time interval storing part 15 may be realized by at least one of the memory unit 103 and the auxiliary storage unit 102, for example.

The data analyzing part 11 obtains data (hereinafter also referred to as "target data") that is a monitoring target, from the data received from the interface unit 105, and classifies the target data for each session. In this embodiment, the data analyzing part 11 is an example of a receiving part. The target data may differ depending on the communication protocol of the monitoring target. For example, in the case of the RTP (Real-time Transport Protocol), data having a header prescribed by the RTP becomes the target data. In addition, in the case of the TCP (Transmission Control Protocol), data (or packet) having a header prescribed by the TCP becomes the target data. The communication protocol of the monitoring target in this embodiment is not limited to a particular communication protocol, but it may be desirable for the communication protocol to flow (or transfer) data at constant intervals.

The session refers to a series of exchanges from the start to end of the communication between communicating entities or, refers to a unit for distinguishing the series of exchanges. The method of distinguishing the session may be appropriately selected depending on the communication protocol. For example, in the case of the RTP, the session may be distinguished from the session of the RTP. In the case of the TCP, the session may be distinguished from a combination of the port number and the IP address of the IP.

The reception time acquiring part 12 acquires the time (or reception time) when the target data is received, from a timer (or clock) of the monitoring apparatus 10.

The real time interval measuring part 13 measures a time interval between the target data, based on the reception time acquired by the reception time acquiring part 12, and the reception time of the immediately preceding target data (that is, the target data one previous to the present target data) related to the same session and included in a reception log stored in the reception log storing part 14. The time interval between the target data corresponds to a difference between the reception time of the newly received target data and the reception time of the previously received target data, for the target data related to the same session. In other words, the real time interval measuring part 13 computes the difference between the reception times related to the two successive target data of the same session, in order to measure the time interval between the target data related to the same session. The time interval measured by the real time interval measuring part 13 will hereinafter also be referred to as a "real time interval". In addition, the real time interval measuring part 13 stores the reception log, including the reception time acquired for the newly received target data and a session identifier (or session ID) of the newly received target data classified by the data analyzing part 11, in the reception log storing part 14. In this embodiment, the real time interval measuring part 13 is an example of a measuring part.

The reception log storing part 14 stores the reception log. The reception log storing part 14 stores the reception log related to at least the target data received last, for each session.

The retransmission time interval storing part 15 stores the time interval (hereinafter also referred to as a "retransmission time interval") between the target data for the case in which the retransmission of the target data is made (or the case in which the loss of the target data occurs) in each relay interval, for each relay interval, as reference information. The retransmission of the target data is basically made when it is judged that the loss of the target data has occurred, in response to a request from the apparatus which waits (or stands by) for the reception of the target data. For example, the base station 30a makes a retransmission request to the transmitting terminal 20 when the data to be received from the transmitting terminal 20 is not received by a reception scheduled time, and the retransmission of the data from the transmitting terminal 20 is executed in response to the request. Similarly, the relay apparatus 30b makes a retransmission request to the base station 30a when the data to be received from the base station 30a is not received by a reception scheduled time, and further, the base station 30a transfers the retransmission request to the transmitting terminal 20. As a result, the retransmission of the data from the transmitting terminal 20 is executed.

The retransmission time interval acquiring part 16 reads the retransmission time interval that is stored in the retransmission time interval storing part 15 for each relay interval.

The loss generated interval judging part 18 compares the real time interval measured by the real time interval measuring part 13 and the retransmission time interval acquired by the retransmission time interval acquiring part 16, and judges the relay interval in which the target data is retransmitted (or the loss of the target data occurred). In this embodiment, the loss generated interval judging part 18 is an example of a judging part.

The retransmission time interval setting part 17 accepts the setting of the retransmission time interval for each relay interval. The retransmission time interval setting part 17 stores the contents of the accepted settings in the retransmission time interval storing part 15.

Next, a description will be given of a first example embodiment. In this first example embodiment, when the loss of a certain target data occurs in any of the relay intervals due to a reception error, it is assumed that the retransmission of the certain target data is made from the transmitting terminal 20 at the transmitting source.

Figure 4:
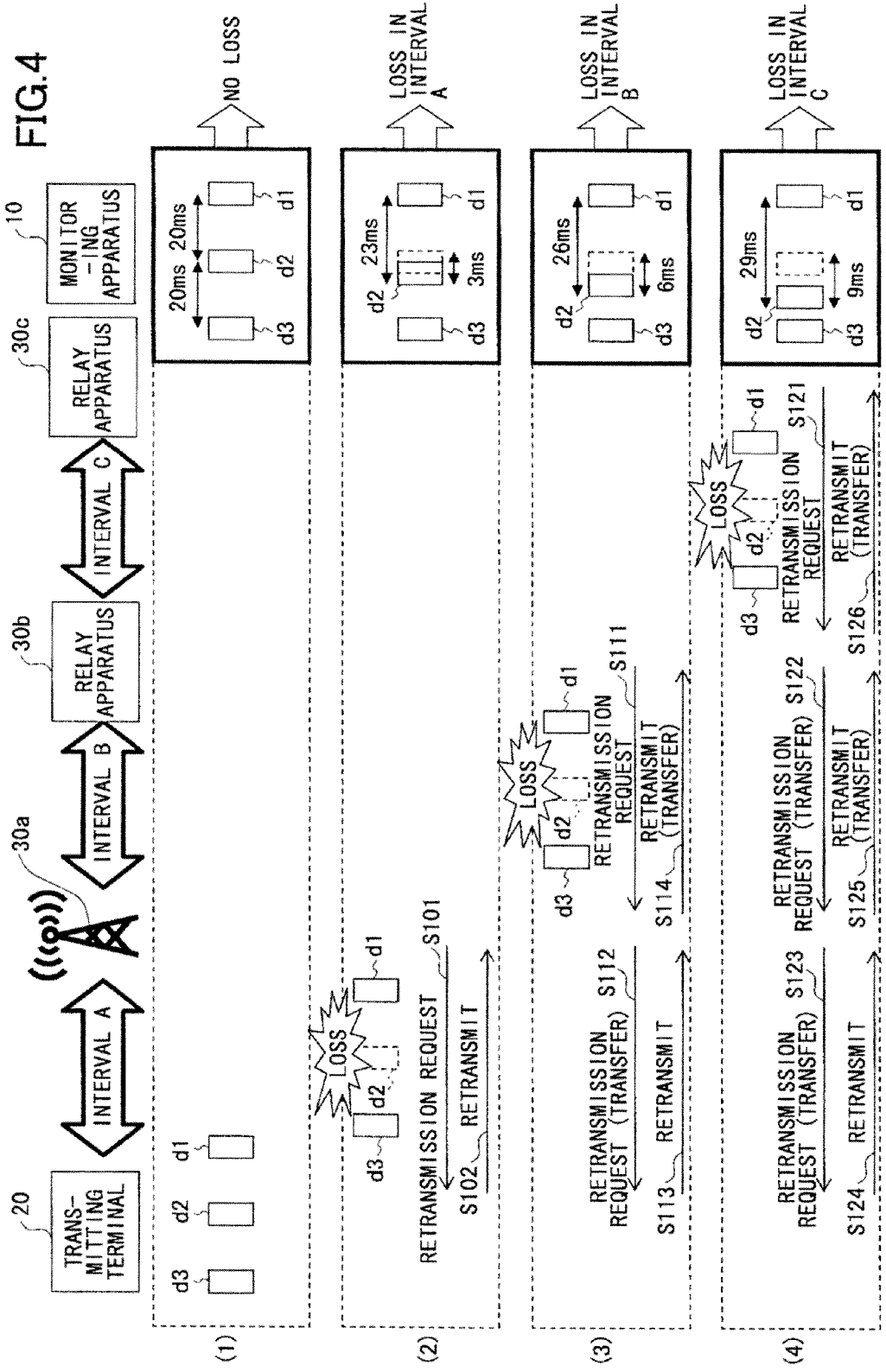
FIG. 4 is a diagram for explaining a first example embodiment.

FIG. 4 is a diagram for explaining the first example embodiment. FIG. 4 illustrates an example of the communication contents related to the retransmission of the target data and the time interval of the data, depending on the relay interval in which the loss of the target data occurred.

In FIG. 4, (1) illustrates a case in which no loss of the target data occurred. In this case, it is assumed for the sake of convenience that the real time interval measured in the monitoring apparatus 10 for the target data d1, d2, and d3 transmitted from the transmitting terminal 20 is 20 ms (milliseconds). It is also assumed that the data transmission is performed regularly at predetermined time intervals, such as 20 ms, as in the case of the VoIP.

In FIG. 4, (2) illustrates a case in which the loss of the target data d2 occurs in the interval A. In this case, a retransmission request is transmitted from the base station 30a with respect to the transmitting terminal 20 (step S101). The transmitting terminal 20 retransmits the target data d2 in response to the retransmission request (step S102).

Suppose that it takes 3 ms to execute the steps S101 and S102. That is, suppose that a retransmission time (or delay) of 3 ms occurs with respect to the transfer of the target data d2. In this case, the real time interval between the target data d1 and the target data d2 measured by the monitoring apparatus 10 becomes 23 ms.

Figure 5:
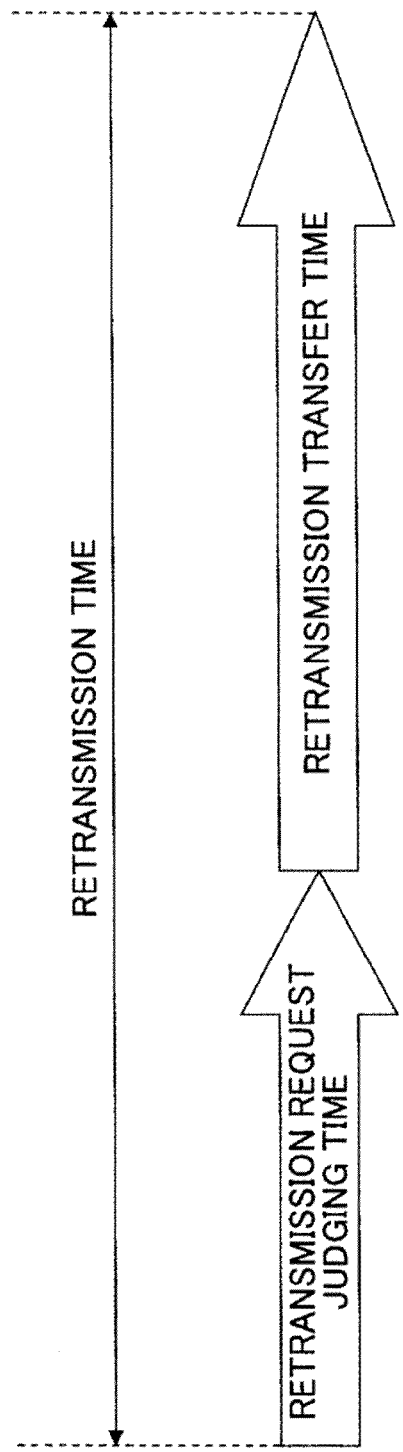
FIG. 5 is a diagram for explaining a retransmission time.

FIG. 5 is a diagram for explaining the retransmission time. As illustrated in FIG. 5, the retransmission time is a sum of a retransmission request judging time and a retransmission transfer time. The retransmission request judging time is the time it takes to judge whether to transmit the retransmission request (that is, request retransmission) when the data does not arrive by its scheduled time in one session. The retransmission transfer time is that time it takes for the retransmitted data to arrive from the time when the retransmission request is made. In FIG. 4, it is assumed for the sake of convenience that the retransmission request judging time of each relay apparatus 30 is constant, and is {20 ms+α}, for example, where α is an arbitrary constant.

In FIG. 4, (3) illustrates a case in which the loss of the target data d2 occurs in the interval B. In this case, the retransmission request is transmitted from the relay apparatus 30b with respect to the base station 30a (step S111). The base station 30a transfers the retransmission request to the transmitting terminal 20 (step S112). The transmitting terminal 20 retransmits the target data d2 in response to the retransmission request (step S113). The base station 30a transfers the target data d2 that is retransmitted to the relay apparatus 30b (step S114).

Suppose that it takes 6 ms to execute the steps S111 through S114. That is, suppose that a retransmission time (or delay) of 6 ms occurs with respect to the transfer of the target data d2. In this case, the real time interval between the target data d1 and the target data d2 measured by the monitoring apparatus 10 becomes 26 ms.

In FIG. 4, (4) illustrates a case in which the loss of the target data d2 occurs in the interval C. In this case, the retransmission request is transmitted from the relay apparatus 30c with respect to the relay apparatus 30b (step S121). The relay apparatus 30b transfers the retransmission request to the base station 30a (step S122). The base station 30a transfers the retransmission request to the transmitting terminal 20 (step S123). The transmitting terminal 20 retransmits the target data d2 in response to the retransmission request (step S124). The base station 30a transfers the target data d2 that is retransmitted to the relay apparatus 30b (step S125). The relay apparatus 30b transfers the target data d2 that is retransmitted to the relay apparatus 30c (step S126).

Suppose that it takes 9 ms to execute the steps S121 through S126. That is, suppose that a retransmission time (or delay) of 9 ms occurs with respect to the transfer of the target data d2. In this case, the real time interval between the target data d1 and the target data d2 measured by the monitoring apparatus 10 becomes 29 ms.

The first example embodiment utilizes the retransmission transfer time (and the real time interval) that differs depending on the relay interval in which the loss occurs. Hence, the farther away the interval in which the loss occurs is from the transmitting apparatus 20, the longer the retransmission transfer time becomes. The first example embodiment utilizes this phenomenon in order to judge the relay interval in which the data retransmission is made (or the data loss occurred).

Figure 6:
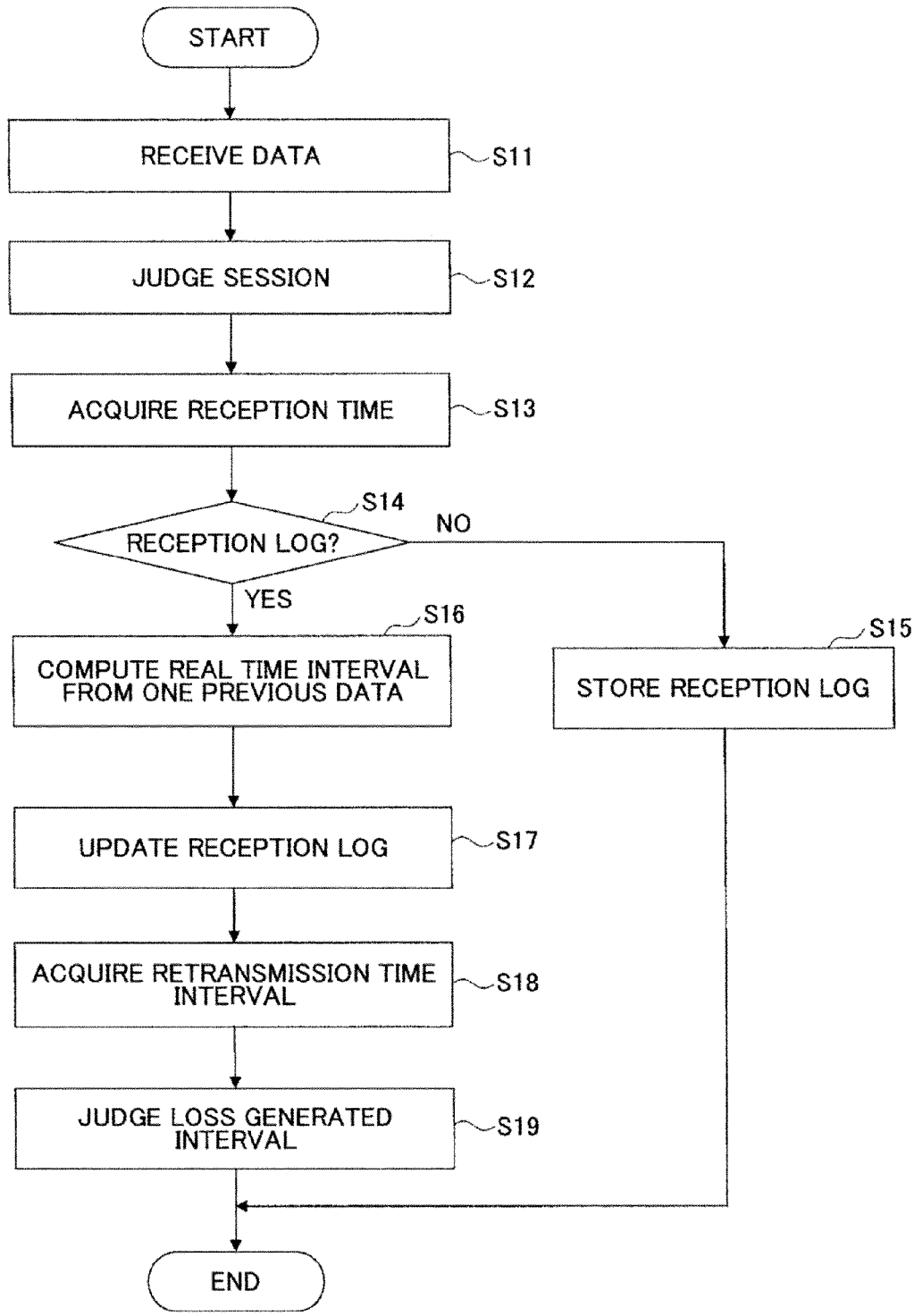
FIG. 6 is a flow chart for explaining an example of a processing procedure executed by the monitoring apparatus in the first example embodiment.

Next, a description will be given of a processing procedure of the monitoring apparatus 10. FIG. 6 is a flow chart for explaining an example of the processing procedure executed by the monitoring apparatus in the first example embodiment. The process illustrated in FIG. 6 may be executed every time the target data is received by the monitoring apparatus 10.

The data analyzing part 11 receives (or detects) the target data via the interface unit 105 (step S11). Then, the data analyzing part 11 judges the session to which the target data belongs, by referring to the header part or the like of the target data (step S12). The session ID is specified as a result of this judgement. The session need not be judged if it is unnecessary to distinguish the sessions. For example, the session need not be judged when one session occupies the network n1.

Next, the reception time acquiring part 12 acquires the present time from the timer of the monitoring apparatus 10 (step S13).

Thereafter, the real time interval measuring part 13 judges whether the reception log related to the session ID judged by the data analyzing part 11 is stored in the reception log storing part 14 (step S14). In other words, the real time interval measuring part 13 judges whether the target data is received in the past for the session having the session ID judged by the data analyzing part 11. If the corresponding reception log is not stored in the reception log storing part (No in step S14), the real time interval measuring part 13 stores a reception log, including the session ID judged by the data analyzing part 11 and the reception time acquired by the reception time acquiring part 12 for the presently received target data, in the reception log storing part 14 (step S15), and the process illustrated in FIG. 6 ends.

If the corresponding reception log is stored in the reception log storing part 14 (Yes in step S14), the real time interval measuring part 13 computes a difference between the reception time included in the reception log and the reception time acquired by the reception time acquiring part 12 for the presently received target data (step S16). The reception time included in the reception log is the reception time of the target data that is received last in the past. In other words, the reception time included in the reception log is the reception time of the target data received one previous to the present target data, for the same session. In addition, the difference of the reception times computed by the real time interval measuring part 13 corresponds to the real time interval.

Next, the real time interval measuring part 13 stores the reception log, including the session ID and the reception time for the presently received target data, in the reception log storing part 14 (step S17). When the upper limit value of the number of logs storable for each session in the reception log storing part 14 is "1", the existing reception log may be updated to the present reception log.

Then, the retransmission time interval acquiring part 16 acquires the retransmission time interval for each relay interval from the retransmission time interval storing part 15 (step S18).

FIG. 7 is a diagram illustrating an example of a structure of the retransmission time interval storage unit in the first example embodiment. In FIG. 7, the retransmission time interval storing part 15 stores the retransmission time interval, as the reference information, for each relay interval. The values of the retransmission time intervals illustrated in FIG. 7 are for the example illustrated in FIG. 4. The information of the retransmission time interval may be a time interval monitored for a case in which test data are intentionally retransmitted in each interval or, may be a transmission delay time computed from transmission parameters.

Next, the loss generated interval judging part 18 compares or collates the real time interval measured by the real time interval measuring part 13 and the retransmission time interval for each relay interval acquired by the retransmission time interval acquiring part 16, and judges the relay interval in which the loss (or retransmission) occurs (step S19).

For example, in the case of the example illustrated in FIG. 7, it may be judged that the loss (or retransmission) occurred in the interval A when the real time interval is 23 ms±10 μsec (microseconds). It may be judged that the loss (or retransmission) occurred in the interval B when the real time interval is 26 ms±10 μsec. It may be judged that the loss (or retransmission) occurred in the interval C when the real time interval is 29 ms±10 μsec. The value±10 μsec is takes into consideration a magnitude ($\beta$) of jitter in the time interval between the target data. In other words, the value±10 μsec takes into consideration the fact that the time interval between the target data may not always be perfectly constant. The magnitude ($\beta$) of jitter may be appropriately determined depending on the requirements, for example.

When the real time interval does not correspond to any of the retransmission time intervals, it may be judged that no loss of the target data occurred. However, it may be regarded that the possibility of the loss is relatively high when (23 ms+$\beta$) <(Real Time Interval)<(26 ms−$\beta$) or, when (26 ms+$\beta$)<(Real Time Interval)<(29 ms−$\beta$). Accordingly, in the first case, it is judged that the loss occurred in the interval A or B, and in the latter case, it may be judged that the loss occurred in the interval B or C. In addition, when the real time interval exceeds (29 ms+β), it may be judged that the loss occurred in the interval C. In other words, when the real time interval falls between the (Retransmission Time Interval±β) for each relay interval, it may be judged that the loss occurred in the two relay intervals. Moreover, when the real time interval exceeds (Maximum Value of Retransmission Time Interval+β), it may be judged that the loss occurred in the relay interval related to this maximum value. In any case, the corresponding relationship of the real time interval and the location where the loss is generated (or "loss generated location") is stored, so that the loss generated location corresponding to the real time interval may be obtained. In this case, the longer the real time interval, the closer the loss generated location in the interval is to the network n2. Hence, it may be judged in this case that the retransmission request is generated from the relay apparatus located farther away from transmitting source.

The judgement result may be stored in the auxiliary storage unit 102 or, displayed on the display unit or the like, for example, if necessary.

The time that is stored in the retransmission time interval storing part 15 for each relay interval may be the retransmission time (or delay time). When storing the retransmission time, 3 ms is stored with respect to the interval A, 6 ms is stored with respect to the interval B, and 9 ms is stored with respect to the interval C, according to the example illustrated in FIG. 4. In this case, the loss generated interval judging part 18 may compare a value obtained by subtracting a standard time interval from the real time interval, and the retransmission time stored for each relay interval. Accordingly, in this case, the retransmission time of each relay interval becomes the example of the time stored in the retransmission time interval storing part 15 in correspondence with each relay interval. The time stored in the retransmission time interval storing part 15 for each relay interval may also be the retransmission time in each of the example embodiments described later.

According to the first example embodiment described above, it is unnecessary to arrange the monitoring apparatus 10 on both ends of each relay interval. Hence, the number of monitoring apparatuses 10 (or the number of monitoring locations) may be reduced. In addition, an increase in the number of monitoring apparatuses 10 depending on the increase in the number of relay intervals may be suppressed.

In the first example embodiment, the retransmission request judging time is constant in each relay apparatus 30, and the first example embodiment is suited for a case in which the retransmission transfer time is relatively long compared to the retransmission request judging time.

In addition, the retransmission time interval, the retransmission time or, the retransmission transfer time that becomes the source of the retransmission time interval and the retransmission time, may actually be measured with respect to the target data. Alternatively, the retransmission time interval, the retransmission time or, the retransmission transfer time may be determined based on measurement of RTT (Round-Trip Time) utilizing a ping command. In addition, a theoretical value of the retransmission time interval, the retransmission time or, the retransmission transfer time may be computed based on a link speed of the network n1, the distance of each relay interval, and the like.

As an example, the retransmission time in this embodiment is determined as a sum of the retransmission request judging time and the retransmission transfer time, as illustrated in FIG. 5. This is based on a precondition that a retransmission process time is negligible short compared to the retransmission time. The retransmission process time is the time required for the apparatus making the retransmission to transmit the retransmission data from the time when the retransmission request is received.

Figure 8:
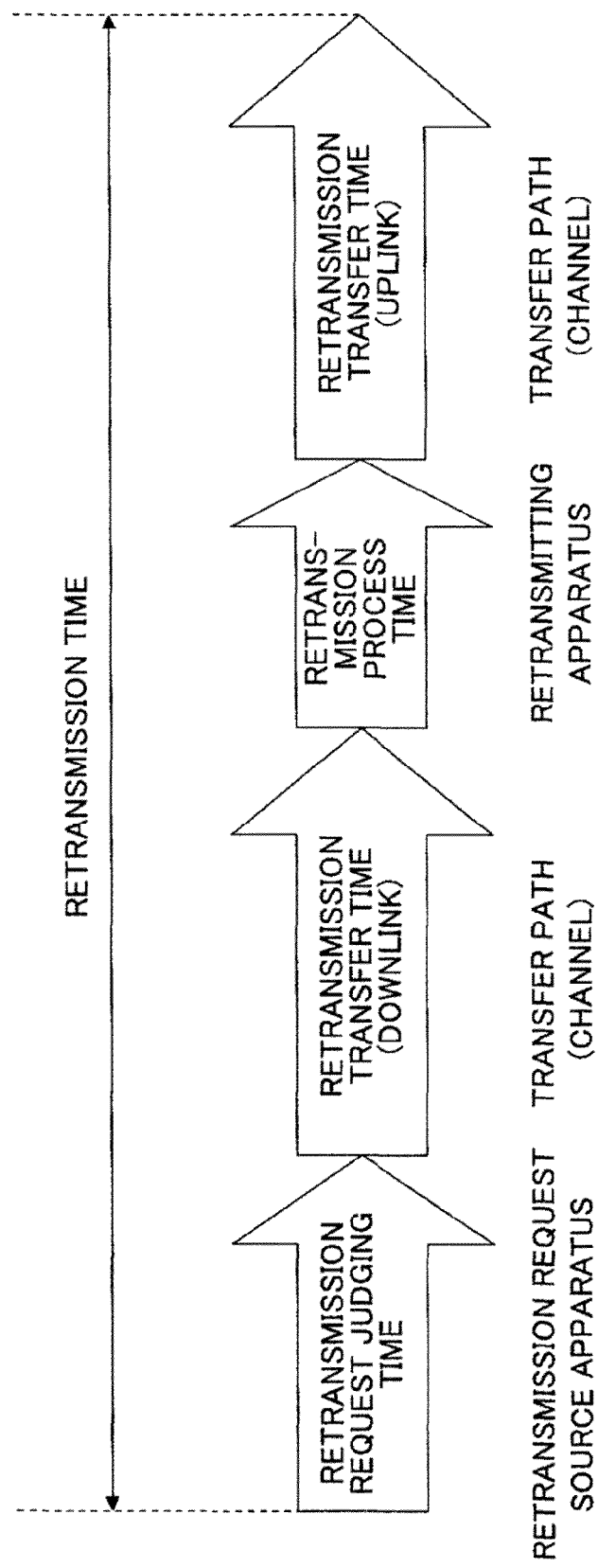
FIG. 8 is a diagram for explaining the retransmission time that take into consideration a retransmission process time.

In a case in which the retransmission process time is not negligible short compared to the retransmission time, the retransmission time may be determined by taking into consideration the retransmission process time. In this case, the retransmission time may be determined by a sum of the retransmission request judging time and the retransmission process time and the retransmission transfer time, as illustrated in FIG. 8. FIG. 8 is a diagram for explaining the retransmission time that take into consideration the retransmission process time.

For example, suppose that the retransmission request judging time of the base station 30a is 1 ms, the retransmission process time of the transmitting terminal 20 is 1 ms, and the retransmission transfer time is 3 ms with respect to the interval A. In this case, the retransmission time of the interval A is 1+1+3=5 ms.

For example, suppose that the retransmission request judging time of the relay apparatus 30b is 1 ms, the retransmission process time of the base station 30a is 2 ms, and the retransmission transfer time is 6 ms with respect to the interval B. In this case, the retransmission time of the interval B is 1+2+6=9 ms.

For example, suppose that the retransmission request judging time of the relay apparatus 30c is 2 ms, the retransmission process time of the relay apparatus 30b is 3 ms, and the retransmission transfer time is 9 ms with respect to the interval C. In this case, the retransmission time of the interval C is 2+3+9=14 ms.

The stored contents of the retransmission time interval storing part 15 for the cases described above become as illustrated in FIG. 9, for example. FIG. 9 is a diagram illustrating an example of stored contents of the retransmission time interval storage unit when the retransmission process time is taken into consideration. In FIG. 9, it is a precondition that the standard time interval is 20 ms. Hence, a value obtained by adding 20 ms with respect to the retransmission time computed in the above described manner becomes the retransmission time interval.

Next, a description will be given of a second example embodiment. More particularly, a description will be given of features of the second example embodiment that differ from those of the first example embodiment. Unless otherwise indicated, the features of the second example embodiment not described in the following are the same as those of the first example embodiment.

In the second example embodiment, the retransmission of the target data is made by the first apparatus that receives the retransmission request. In addition, the retransmission request judging time differs for each relay apparatus 30.

Figure 10:
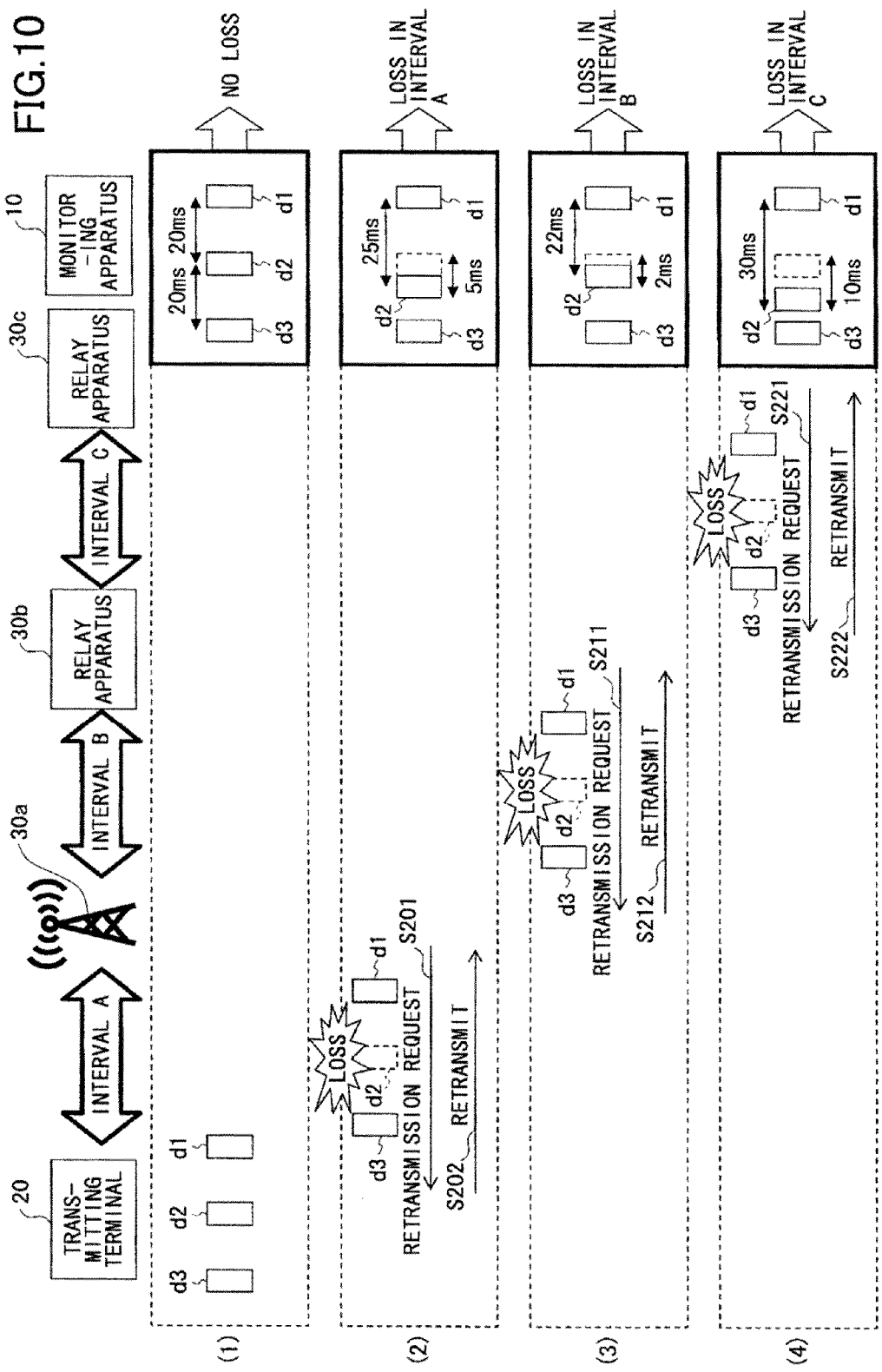
FIG. 10 is a diagram for explaining a second example embodiment.

FIG. 10 is a diagram for explaining the second example embodiment. In FIG. 10, it is assumed for the sake of convenience that the retransmission transfer time is constant.

In FIG. 10, (1) illustrates a case in which no loss of the target data occurred. In this case, it is assumed for the sake of convenience that the real time interval measured in the monitoring apparatus 10 for the target data d1, d2, and d3 transmitted from the transmitting terminal 20 is 20 ms.

In FIG. 10, (2) illustrates a case in which the loss of the target data d2 occurs in the interval A. In this case, a retransmission request is transmitted from the base station 30a with respect to the transmitting terminal 20 (step S201). The transmitting terminal 20 retransmits the target data d2 in response to the retransmission request (step S202).

Suppose that the retransmission request judging time of the base station 30a is 5 ms. That is, suppose that after receiving the target data d1, the base station 30a transmits the retransmission request when no data is received after 25 ms elapses. In this case, the real time interval between the target data d1 and the target data d2, measured by the monitoring apparatus 10, becomes 25 ms.

In FIG. 10, (3) illustrates a case in which the loss of the target data d2 occurs in the interval B. In this case, the retransmission request is transmitted from the relay apparatus 30b with respect to the base station 30a (step S211). The base station 30a retransmits the target data d2 in response to the retransmission request (step S212).

Suppose that the retransmission request judging time of the relay apparatus 30b is 2 ms. That is, suppose that after receiving the target data d1, the relay apparatus 30b transmits the retransmission request when no data is received after 22 ms elapses. In this case, the real time interval between the target data d1 and the target data d2, measured by the monitoring apparatus 10, becomes 22 ms.

In FIG. 10, (4) illustrates a case in which the loss of the target data d2 occurs in the interval C. In this case, the retransmission request is transmitted from the relay apparatus 30c with respect to the relay apparatus 30b (step S221). The relay apparatus 30b retransmits the target data d2 in response to the retransmission request (step S222).

Suppose that the retransmission request judging time of the relay apparatus 30c is 10 ms.

That is, suppose that after receiving the target data d1, the relay apparatus 30c transmits the retransmission request when no data is received after 30 ms elapses. In this case, the real time interval between the target data d1 and the target data d2, measured by the monitoring apparatus 10, becomes 30 ms.

As described above, the second example embodiment utilizes the fact that the retransmission transfer time (and thus the real time interval) differs depending on the relay interval in which the loss of data occurs.

The processing procedure executed by the monitoring apparatus 10 in the second example embodiment is as described above in conjunction with FIG. 6. However, the stored contents of the retransmission time interval storing part 15 becomes as illustrated in FIG. 11, for example.

FIG. 11 is a diagram illustrating an example of the structure of the retransmission time interval storage unit in the second example embodiment. The values of the retransmission time interval illustrated in FIG. 11 are for the example illustrated in FIG. 10.

Based on the example illustrated in FIG. 11, when the real time interval is 25 ms±10 μsec, it is judged that the loss of data is generated (or retransmission is made) in the interval A. When the real time interval is 22 ms±10 μsec, it is judged that the loss of data is generated (or retransmission is made) in the interval B. When the real time interval is 30 ms±10 μsec, it is judged that the loss of data is generated (or retransmission is made) in the interval C.

As described above, the second example embodiment may obtain effects similar to those obtainable by the first example embodiment. The second example embodiment is suited for a case in which the retransmission transfer time of each relay interval is constant, and the retransmission transfer time is relatively short compared to the retransmission request judging time.

In addition, in each relay apparatus 30, the retransmission request judging time may be actually measured with respect to the target data or, a theoretical value of the retransmission request judging time may be computed based on the specifications and the like of each relay apparatus 30.

Next, a description will be given of a third example embodiment. More particularly, a description will be given of features of the third example embodiment that differ from those of the second example embodiment. Unless otherwise indicated, the features of the third example embodiment not described in the following are the same as those of the second example embodiment.

In the third example embodiment, a retry of the retransmission request is made, and an upper limit of the number of retries is taken into consideration.

Figure 12:
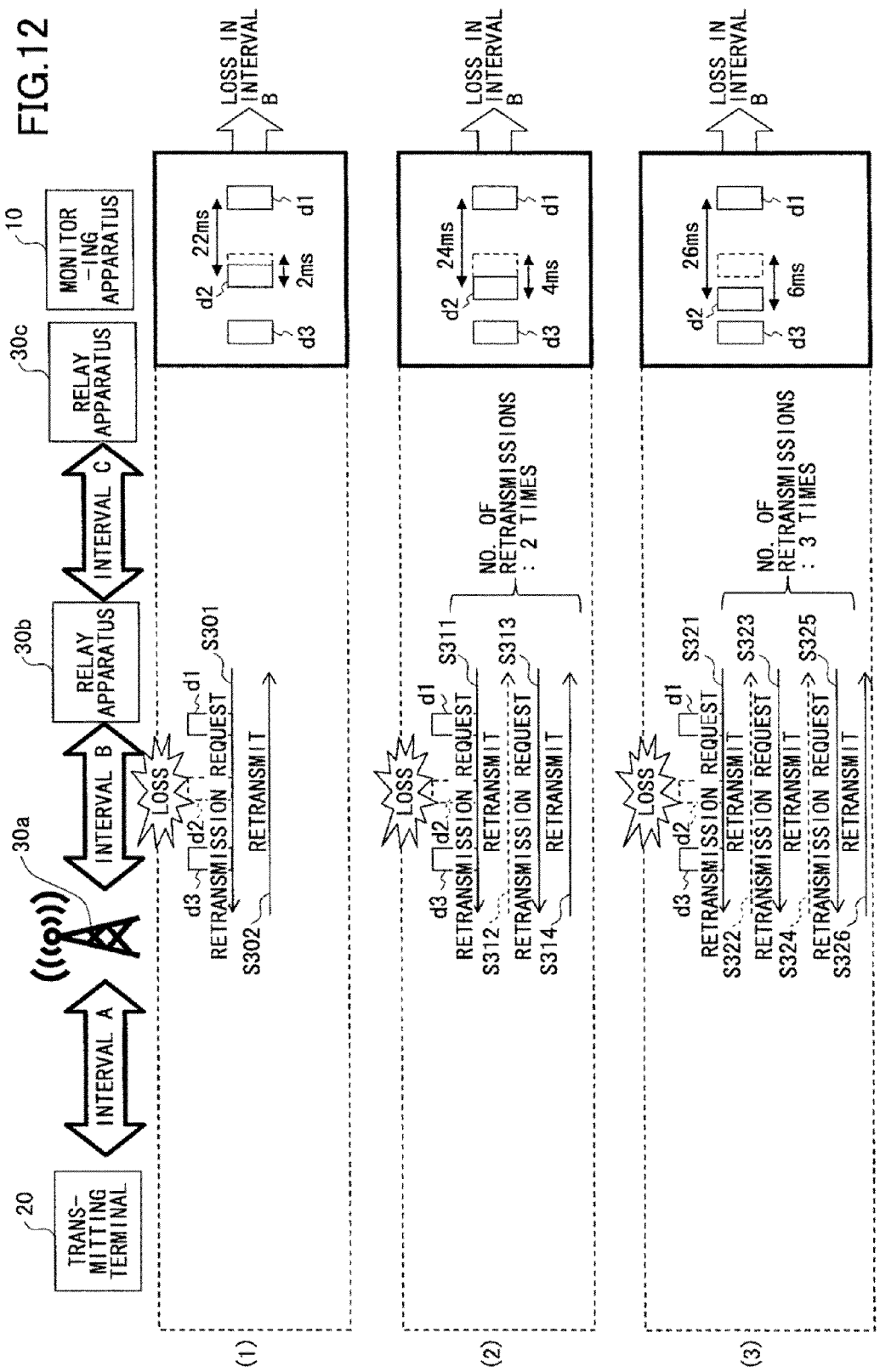
FIG. 12 is a diagram for explaining a third example embodiment.

FIG. 12 is a diagram for explaining the third example embodiment. In FIG. 12, it is assumed for the sake of convenience that the retransmission transfer time is constant, and that the retransmission time in the interval B is 2 ms.

In FIG. 12, (1) illustrates a case in which the relay apparatus 30b transmits the retransmission request with respect to the base station 30a depending on the loss generated in the interval B (step S301). The base station 30a retransmits the target data d2 in response to the retransmission request (step S302). As a result, the real time interval is measured in the monitoring apparatus 10. In this case, the real time interval between the target data d1 and the target data d2 measured in the monitoring apparatus 10 is 22 ms.

In FIG. 12, (2) illustrates a case in which the relay apparatus 30b transmits the retransmission request with respect to the base station 30a depending on the loss generated in the interval B (step S311). The base station 30a retransmits the target data d2 in response to the retransmission request (step S312). Because the loss occurs during the retransmission, the relay apparatus 30b retransmits the retransmission request (step S313). A dotted arrow indicates a loss generated during the retransmission. The base station 30a retransmits the target data d2 in response to the retransmission request (step S314).

In FIG. 12, (2) illustrates a case in which the retransmission is performed two times. As a result, the real time interval between the target data d1 and the target data d2 measured in the monitoring apparatus 10 is 24 ms.

In FIG. 12, (3) illustrates a case in which the relay apparatus 30b transmits the retransmission request with respect to the base station 30a depending on the loss generated in the interval B (step S321). The base station 30a retransmits the target data d2 in response to the retransmission request (step S322). Because the loss occurs during the retransmission, the relay apparatus 30b retransmits the retransmission request (step S323). The base station 30a retransmits the target data d2 in response to the retransmission request (step S324). Because the loss occurs during the retransmission, the relay apparatus 30b again retransmits the retransmission request (step S325). The base station 30a retransmits the target data d2 in response to the retransmission request (step S326).

In FIG. 12, (3) illustrates a case in which the retransmission is performed three times. As a result, the real time interval between the target data d1 and the target data d2 measured in the monitoring apparatus 10 is 26 ms.

Figure 13:
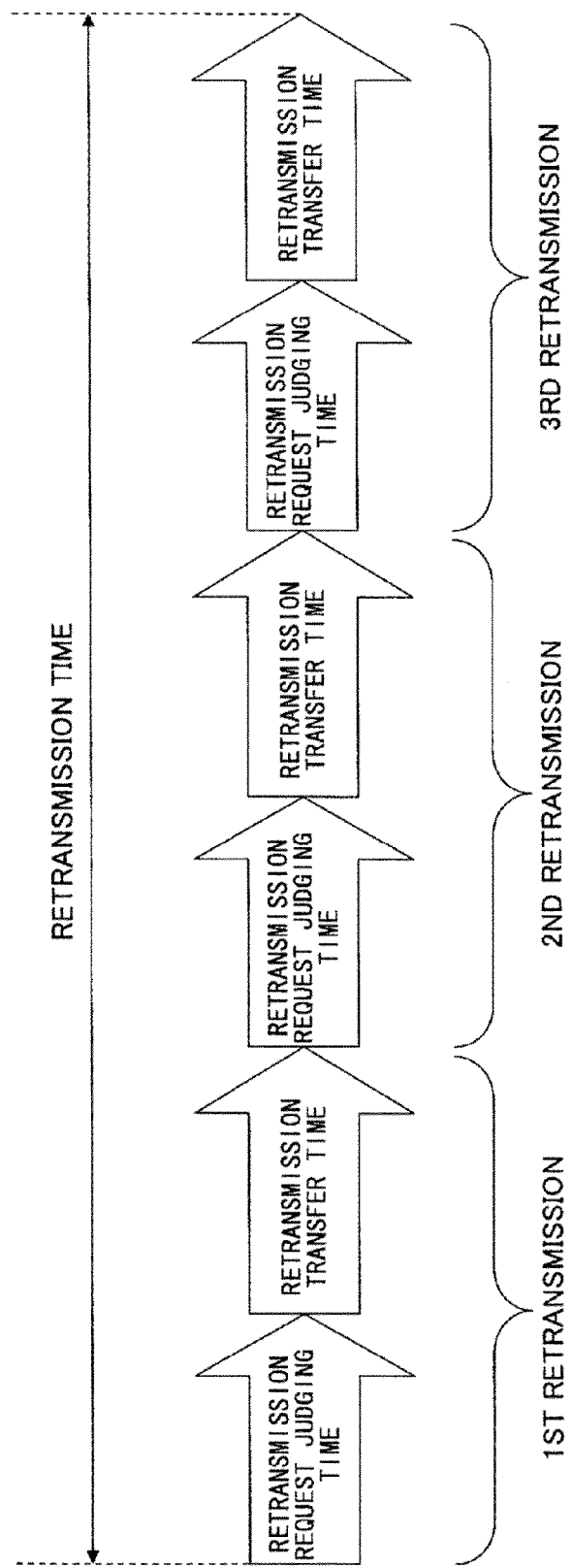
FIG. 13 is a diagram for explaining the retransmission time for a case in which the retransmission is performed a plurality of times.

In other words, when the retransmission of the same data is performed a plurality of times in the same relay interval, the retransmission time required for the data becomes a product of retransmission time per retransmission and the number of retransmissions. FIG. 13 is a diagram for explaining the retransmission time for a case in which the retransmission is performed a plurality of times. As an example, FIG. 13 illustrates a case in which the retransmission is performed three times.

Hence, the third example embodiment takes into consideration the above described matters in order to judge the relay interval in which the loss occurs (or the retransmission is made).

The processing procedure executed by the monitoring apparatus 10 in the third example embodiment is as described above in conjunction with FIG. 6. However, the stored contents of the retransmission time interval storing part 15 becomes as illustrated in FIG. 14, for example.

FIG. 14 is a diagram illustrating an example of the structure of the retransmission time interval storage unit in the third example embodiment. The values of the retransmission time interval illustrated in FIG. 14 are for the example illustrated in FIG. 12. In FIG. 12, one (1) retransmission time interval is set with respect to the interval A, three (3) retransmission time intervals are set with respect to the interval B, and one (1) retransmission time interval is set with respect to the interval C. The number of retransmission time intervals in each relay interval depends on the upper limit of the number of retransmissions. In other words, the example illustrated in FIG. 12 corresponds to a case in which the upper limit of the number of retransmissions is 1 for the interval A, 3 for the interval B, and 1 for the interval C. Hence, two or more retransmission time intervals are set with respect to the interval A or C when the upper limit of the number of retransmission is two (2) or greater.

Based on the example illustrated in FIG. 14, when the real time interval is 25 ms±10 μsec, it is judged that the loss of data is generated (or retransmission is made) in the interval A. When the real time interval is 22 ms±10 μsec, 24 ms±10 μsec or 26 ms±10 μsec, it is judged that the loss of data is generated (or retransmission is made) in the interval B. When the real time interval is 30 ms±10 μsec, it is judged that the loss of data is generated (or retransmission is made) in the interval C.

As described above, the third example embodiment may appropriately judge the relay interval in which the loss occurs (or retransmission is made) even in the case in which the retry of the retransmission is made.

Next, a description will be given of a fourth example embodiment. More particularly, a description will be given of features of the fourth example embodiment that differ from those of the third example embodiment. Unless otherwise indicated, the features of the fourth example embodiment not described in the following are the same as those of the third example embodiment.

Figure 15:
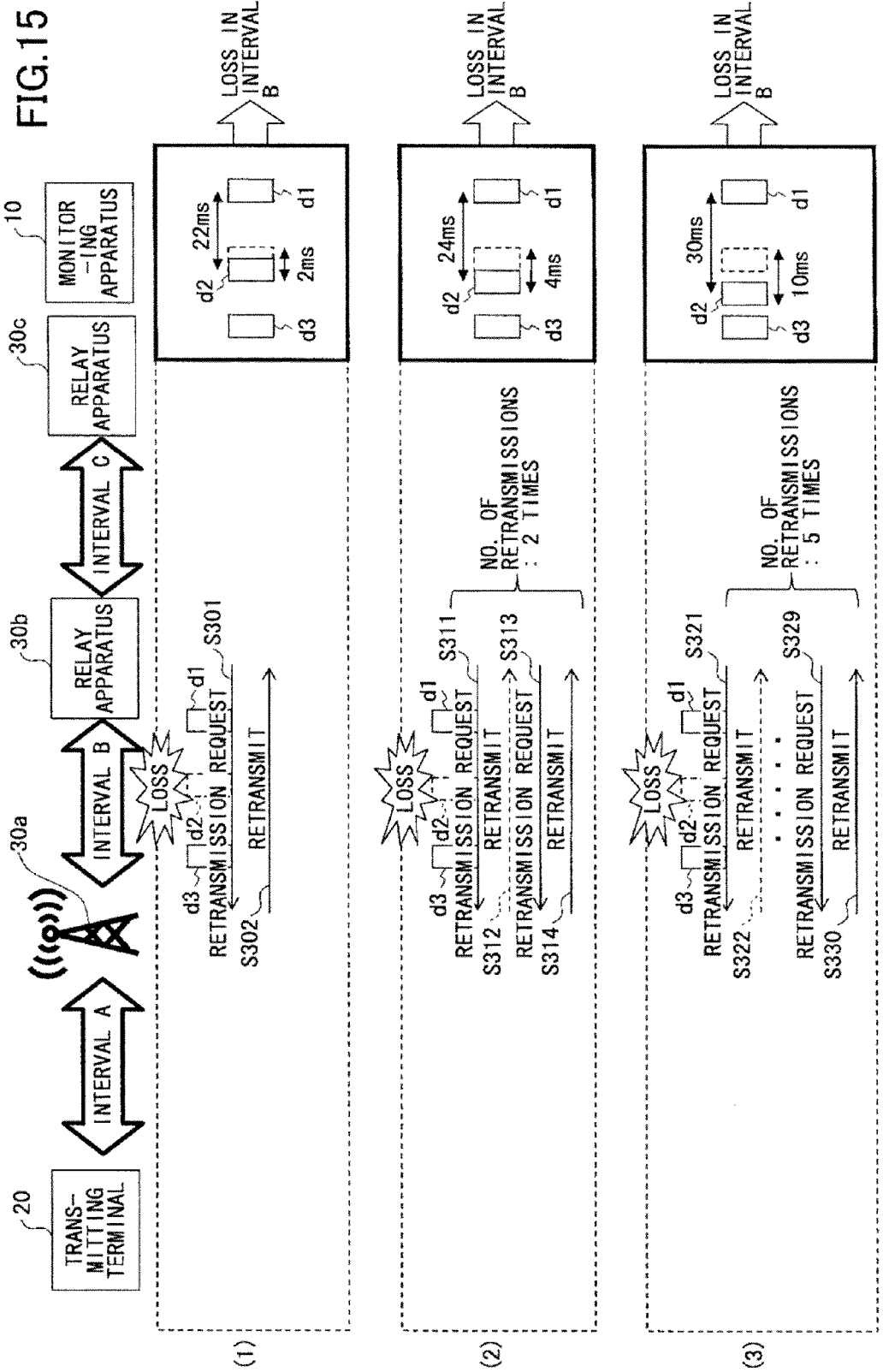
FIG. 15 is a diagram for explaining a fourth example embodiment.

FIG. 15 is a diagram for explaining the fourth example embodiment. In FIG. 15, it is assumed for the sake of convenience that the retransmission transfer time is constant. In addition, it is assumed that the retransmission time in the interval B is 2 ms. In FIG. 15, those parts that are the same as those corresponding parts in FIG. 12 are designated by the same reference numerals, and a description thereof will be omitted.

In FIG. 15, (3) illustrates a case in which the retransmission is repeated five (5) times. In other words, the upper limit value of the number of retransmissions in the interval B is "5" in the fourth example embodiment. Hence, when the retransmission is generated in the interval B in the fourth example embodiment, the real time interval that may be measured by the monitoring apparatus 10 is 22 ms, 24 ms, 26 ms, 28 ms, or 30 ms.

The processing procedure executed by the monitoring apparatus 10 in the fourth example embodiment is as described above in conjunction with FIG. 6. However, the stored contents of the retransmission time interval storing part 15 becomes as illustrated in FIG. 16, for example.

FIG. 16 is a diagram illustrating an example of the structure of the retransmission time interval storage unit in the fourth example embodiment. The values of the retransmission time interval illustrated in FIG. 16 are for the example illustrated in FIG. 15. FIG. 16 does not list the retransmission time interval for each number of retransmissions, but specifies a range by a minimum value and a maximum value. The minimum value indicates the retransmission time interval for the case in which the number of retransmissions is "1". The maximum value indicates the retransmission time interval for the case in which the number of retransmissions is "5".

Based on the example illustrated in FIG. 16, when the real time interval is 25 ms±10 μsec, it is judged that the loss of data is generated (or retransmission is made) in the interval A. When the real time interval is 22 ms-10 μsec or longer and is 30 ms+10 μsec or shorter, it is judged that the loss of data is generated (or retransmission is made) in the interval B. When the real time interval is 30 ms±10 μsec, it is judged that the loss of data is generated (or retransmission is made) in the interval C.

The case in which the real time interval is 25 ms±10 μsec overlaps for the interval A and the interval B. Hence, when the real time interval of 25 ms±10 μsec is measured (or monitored), it may be judged that the loss is generated in the interval A or the interval B. Similarly, the case in which the real time interval is 30 ms±10 μsec overlaps for the interval B and the interval C. Hence, when the real time interval of 30 ms±10 μsec is measured (or monitored), it may be judged that the loss is generated in the interval B or the interval C. When the above overlap occurs, the judgement result may indicate that the loss occurred in two or more relay intervals, and such a judgement result may also be obtained in the third example embodiment described above.

According to the fourth example embodiment, the range of the retransmission time interval may be specified when the upper limit of the number of retransmissions is relatively large, in order to simplify the operation of setting the retransmission time interval and the like.

The first through fourth example embodiments may not necessarily have an exclusive or selective relationship, and the first through fourth example embodiments may be arbitrarily combined. More particularly, the retransmission operation may not be the same in each relay interval. For example, the retransmission may not be made when the loss occurs in the interval A. The first apparatus (base station 30a) that receives the retransmission request may make the retransmission when the loss occurs in the interval B. The transmitting terminal 20 may make the retransmission when the loss occurs in the interval C. With respect to a network system that behaves in such a manner, the first and second example embodiments may be combined. In addition, when the retransmission may be made a plurality of times in any relay interval, the third or fourth example embodiment may further be combined.

The processing procedure executed by the monitoring apparatus 10 when the example embodiments are combined may be as described above in conjunction with FIG. 6. In addition, the stored contents of the retransmission time interval storing part 15 may be the same as those of the example embodiments described above for each relay interval.

Of course, each of the first through fourth example embodiments may be applied similarly to the case in which the network n1 branches.

FIG. 17 is a diagram illustrating an example of the network structure having a branch. In FIG. 17, the relay apparatus 30b forms branching point. In other words, a network forming the interval D is connected between the relay apparatus 30b and a wireless LAN access point 50. In this case, the retransmission time interval storing part 15 may additionally store the retransmission time interval with respect to the interval D. Similarly, when the network n1 includes an additional branch or a branch from a branch, the retransmission time interval storing part 15 may additionally store the retransmission time interval with respect to each relay interval. In this case, with respect to the retransmission time interval for each relay interval, the possibility of a partial or total overlap of the real time interval increases. When the real time interval is measured (or monitored) in the partial or total overlap range, the two or more relay intervals related to the partial or total overlap range may be judged as being the intervals in which the loss may be generated.

Although the embodiments are numbered with, for example, "first," "second," "third," or "fourth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A monitoring apparatus comprising:
a processor; and
a storage unit configured to store a program to be executed by the processor,
said processor comprising:
a receiving part configured to receive data transmitted from a transmitting source apparatus at predetermined time intervals, via a plurality of relay apparatuses configured to make a retransmission request depending on a reception error;
a measuring part configured to measure a reception time interval between consecutively received data; and
a judging part configured to judge one of the plurality of relay apparatuses making the retransmission request, based on the reception time interval measured by the measuring part.

2. The monitoring apparatus as claimed in claim 1,
wherein the judging part judges a failure between a first relay apparatus and an apparatus located in a stage preceding the first relay apparatus when the judging part judges that the first relay apparatus is making the retransmission request, and
wherein the apparatus located in the stage preceding the first relay apparatus is formed by the transmitting source apparatus or a second relay apparatus other than the first relay apparatus.

3. The monitoring apparatus as claimed in claim 1, wherein the judging part judges that the relay apparatus making the retransmission request is located at a latter stage farther away with reference to the transmitting apparatus as the reception time interval measured by the measuring part becomes longer.

4. A monitoring method to be implemented in a computer, the monitoring method comprising:
receiving data transmitted from a transmitting source apparatus at predetermined time intervals, via a plurality of relay apparatuses configured to make a retransmission request depending on a reception error;
measuring a reception time interval between consecutively received data; and
judging, by the computer, one of the plurality of relay apparatuses making the retransmission request, based on the reception time interval measured by the measuring.

5. The monitoring method as claimed in claim 4,
wherein the judging judges a failure between a first relay apparatus and an apparatus located in a stage preceding the first relay apparatus when the judging judges that the first relay apparatus is making the retransmission request, and
wherein the apparatus located in the stage preceding the first relay apparatus is formed by the transmitting source apparatus or a second relay apparatus other than the first relay apparatus.

6. The monitoring method as claimed in claim 4, wherein the judging judges that the relay apparatus making the retransmission request is located at a latter stage farther away with reference to the transmitting apparatus as the reception time interval measured by the measuring becomes longer.

7. A non-transitory computer-readable storage medium that stores a program which, when executed by a computer, causes the computer to perform a monitoring process, the process comprising:
a receiving procedure to receive data transmitted from a transmitting source apparatus at predetermined time intervals, via a plurality of relay apparatuses configured to make a retransmission request depending on a reception error;
a measuring procedure to measure a reception time interval between consecutively received data; and
a judging procedure causing the computer to judge one of the plurality of relay apparatuses making the retransmission request, based on the reception time interval measured by the measuring procedure.

8. The non-transitory computer-readable storage medium as claimed in claim 7,
wherein the judging procedure causes the computer to judge a failure between a first relay apparatus and an apparatus located in a stage preceding the first relay apparatus when the judging procedure judges that the first relay apparatus is making the retransmission request, and
wherein the apparatus located in the stage preceding the first relay apparatus is formed by the transmitting source apparatus or a second relay apparatus other than the first relay apparatus.

9. The non-transitory computer-readable storage medium as claimed in claim 7, wherein the judging procedure causes the computer to judge that the relay apparatus making the retransmission request is located at a latter stage farther away with reference to the transmitting apparatus as the reception time interval measured by the measuring procedure becomes longer.

* * * * *